(12) United States Patent
Wang et al.

(10) Patent No.: US 11,422,817 B2
(45) Date of Patent: Aug. 23, 2022

(54) METHOD AND APPARATUS FOR EXECUTING INSTRUCTIONS INCLUDING A BLOCKING INSTRUCTION GENERATED IN RESPONSE TO DETERMINING THAT THERE IS DATA DEPENDENCE BETWEEN INSTRUCTIONS

(71) Applicant: Kunlunxin Technology (Beijing) Company Limited, Beijing (CN)

(72) Inventors: Jing Wang, Beijing (CN); Wei Qi, Beijing (CN); Yupeng Li, Beijing (CN); Xiaozhang Gong, Beijing (CN)

(73) Assignee: Kunlunxin Technology (Beijing) Company Limited, Beijing (CN)

( * ) Notice: Subject to any disclaimer, the term of this patent is extended or adjusted under 35 U.S.C. 154(b) by 0 days.

(21) Appl. No.: 16/458,381

(22) Filed: Jul. 1, 2019

(65) Prior Publication Data
US 2020/0050450 A1 Feb. 13, 2020

(30) Foreign Application Priority Data
Aug. 10, 2018 (CN) .......................... 201810911185.X

(51) Int. Cl.
*G06F 9/38* (2018.01)
(52) U.S. Cl.
CPC ................. *G06F 9/3836* (2013.01)
(58) Field of Classification Search
CPC ................ G06F 9/3836; G06F 9/3838; G06F 9/00–3897; G06F 15/00–825
See application file for complete search history.

(56) References Cited

U.S. PATENT DOCUMENTS 5,968,135 A 10/1999 Teramoto et al.
6,006,325 A * 12/1999 Burger ................ G06F 9/30087
712/214

(Continued)

FOREIGN PATENT DOCUMENTS

CN 105975252 A 9/2016
CN 106227507 A 12/2016

(Continued)

OTHER PUBLICATIONS

Shen et al. (Shen) (Modern processor design fundamentals of superscalar processors), Beta Edition, 2002, pp. 99, 114, 118, 122, 126, 157 (Year: 2002).*

*Primary Examiner* — Keith E Vicary
(74) *Attorney, Agent, or Firm* — The Webb Law Firm

(57) ABSTRACT

A method and apparatus for executing an instruction are provided. In the method, an instruction queue is first generated, and an instruction from the instruction queue in preset order is acquired. Then, a sending step including: determining a type of the acquired instruction; determining, in response to determining that the acquired instruction is an arithmetic instruction, an executing component for executing the arithmetic instruction from an executing component set; and sending the arithmetic instruction to the determined executing component is executed. Last, in response to determining that the acquired instruction is a blocking instruction, a next instruction is acquired after receiving a signal for instructing an instruction associated with the blocking instruction being completely executed.

16 Claims, 4 Drawing Sheets

(56) References Cited

U.S. PATENT DOCUMENTS

| | | | |
|---|---|---|---|
| 6,438,681 B1 * | 8/2002 | Arnold | G06F 9/3802 |
| | | | 712/216 |
| 6,609,192 B1 * | 8/2003 | Guthrie | G06F 9/30087 |
| | | | 712/216 |
| 6,708,269 B1 * | 3/2004 | Tiruvallur | G06F 9/30181 |
| | | | 712/225 |
| 7,634,591 B2 | 12/2009 | Irish et al. | |
| 7,685,405 B1 * | 3/2010 | Chow | G06F 15/7842 |
| | | | 712/35 |
| 8,516,454 B2 | 8/2013 | Mizrachi et al. | |
| 10,664,283 B2 | 5/2020 | Guo et al. | |
| 2001/0039610 A1 | 11/2001 | Busa et al. | |
| 2002/0087833 A1 * | 7/2002 | Burns | G06F 9/3853 |
| | | | 712/215 |
| 2006/0101289 A1 * | 5/2006 | Dang | G06F 9/30167 |
| | | | 713/300 |
| 2010/0100712 A1 * | 4/2010 | Mejdrich | G06F 9/3009 |
| | | | 712/214 |
| 2010/0106945 A1 | 4/2010 | Yoshida | |

FOREIGN PATENT DOCUMENTS

| | | |
|---|---|---|
| CN | 108037680 A | 5/2018 |
| CN | 108182111 A | 6/2018 |
| JP | 10149285 A | 6/1998 |
| JP | 2007200295 A | 8/2007 |
| JP | 2011527788 A | 11/2011 |
| JP | 2012174114 A | 9/2012 |
| WO | 2008155839 A1 | 12/2004 |

\* cited by examiner

METHOD AND APPARATUS FOR EXECUTING INSTRUCTIONS INCLUDING A BLOCKING INSTRUCTION GENERATED IN RESPONSE TO DETERMINING THAT THERE IS DATA DEPENDENCE BETWEEN INSTRUCTIONS

CROSS-REFERENCE TO RELATED APPLICATION

This application claims priority to Chinese Patent Application No. 201810911185.X filed Aug. 10, 2018, the disclosure of which is hereby incorporated by reference in its entirety.

TECHNICAL FIELD

Embodiments of the present disclosure relate to the field of computer technology, and particularly to a method and apparatus for executing an instruction.

BACKGROUND

In recent years, with the emergence and development of the artificial intelligence technology, the model algorithm represented by deep learning and the data processing algorithm represented by big data have been widely used in various fields, such as voice recognition, image recognition, and natural language processing.

In general, in the deep learning model, there exists a large number of compute-intensive operators, e.g., matrix computation, convolution, pooling, activation, and standardization. In the data processor, there also exists a large number of compute-intensive operators, e.g., data query, data filtering, data connection, and data ranking. Since these operations are very time consuming and it is difficult for the computational power of the conventional CPU (Central Processing Unit) to meet the demands, heterogeneous computing prevails. And therefore, various special purpose deep learning processors and special purpose big data processors are developed, such as a GPU (Graphics Processing Unit), and an ASIC (Application Specific Integrated Circuit).

In the existing technologies, generally a plurality of stand-alone executing components are provided in a special purpose processor. For example, the special purpose deep learning processor is provided with an executing component for matrix computing, and an executing component for image convolution calculating; and the special purpose big data processor is provided with an executing component for data filtering, and an executing component for data ranking. Each stand-alone executing component needs to acquire an instruction to be executed from an instruction queue.

SUMMARY

Embodiments of the present disclosure present a method and apparatus for executing an instruction.

In a first aspect, an embodiment of the present disclosure provides a method for executing an instruction, including: acquiring an instruction queue; acquiring a to-be-sent instruction from the instruction queue in preset order, and executing following sending: determining a type of the to-be-sent instruction; determining, in response to determining that the to-be-sent instruction is an arithmetic instruction, an executing component executing the to-be-sent instruction from an executing component set, and sending the to-be-sent instruction to the determined executing component; and acquiring, in response to determining that the to-be-sent instruction is a blocking instruction, a next to-be-sent instruction after receiving a signal for indicating an instruction associated with the to-be-sent instruction being completely executed, and continuing to execute the sending.

In some embodiments, the method further includes: counting a number of instructions completely executed by the executing component in the executing component set.

In some embodiments, the instruction associated with the to-be-sent instruction includes an arithmetic type of the instruction and an instruction number; and the acquiring a next to-be-sent instruction after receiving a signal for indicating an instruction associated with the to-be-sent instruction being completely executed includes: using an executing component executing the arithmetic instruction as a target executing component, and updating, in response to receiving a signal of completely executing the instruction returned by the target executing component, the number of instructions completely executed by the target executing component; determining whether the updated number of instructions completely executed by the target executing component is greater than or equal to the instruction number; and acquiring, in response to determining that the updated number of instructions completely executed by the target executing component is greater than or equal to the instruction number, the next to-be-sent instruction.

In some embodiments, the instruction queue is established by: receiving task information; extracting at least two arithmetic instructions from the task information; selecting an arithmetic instruction from the at least two arithmetic instructions in order of instruction execution for use as a to-be-added instruction, and executing following adding: determining whether there is data dependence between the to-be-added instruction and an arithmetic instruction previously added to the instruction queue; and adding, in response to determining that there is no data dependence, the to-be-added instruction to the instruction queue; and generating, in response to determining that there is data dependence, a blocking instruction associated with a dependent arithmetic instruction, adding the generated blocking instruction and the to-be-added instruction sequentially to the instruction queue, selecting an arithmetic instruction from the at least two arithmetic instructions for use as the to-be-added instruction, and continuing to execute the adding.

In some embodiments, the instruction queue is established by: receiving task information; extracting at least two arithmetic instructions from the task information; selecting an arithmetic instruction from the at least two arithmetic instructions in order of instruction execution for use as a to-be-added instruction, and executing following adding: determining a number of cacheable instructions of an executing component for executing the to-be-added instruction; determining an instruction number of the to-be-added instruction in a given arithmetic type in order of adding to the instruction queue; determining whether the instruction number minus one is less than or equal to the number of cacheable instructions; and adding, in response to determining that the instruction number minus one is less than or equal to the number of cacheable instructions, the to-be-added instruction to the instruction queue; and generating, in response to determining that the instruction number minus one is greater than the number of cacheable instructions, a blocking instruction associated with an arithmetic instruction having an instruction number identical to the number of cacheable instructions, adding the generated blocking instruction and the to-be-added instruction sequentially to the instruction queue, selecting an arithmetic instruction from the at least two arithmetic instructions for use as the to-be-added instruction, and continuing to execute the adding.

In a second aspect, an embodiment of the present disclosure provides an apparatus for executing an instruction, including: an instruction queue acquiring module, configured to acquire an instruction queue; an instruction sending module, configured to acquire a to-be-sent instruction from the instruction queue in preset order, and execute following sending: determining a type of the to-be-sent instruction; determining, in response to determining that the to-be-sent instruction is an arithmetic instruction, an executing component executing the to-be-sent instruction from an executing component set, and sending the to-be-sent instruction to the determined executing component; and a to-be-sent instruction acquiring module, configured to acquire, in response to determining that the to-be-sent instruction is a blocking instruction, a next to-be-sent instruction after receiving a signal for indicating an instruction associated with the to-be-sent instruction being completely executed, and continue to execute the sending.

In some embodiments, the apparatus for executing an instruction further includes: a counting module, configured to count a number of instructions completely executed by the executing component in the executing component set.

In some embodiments, the instruction associated with the to-be-sent instruction includes an arithmetic type of the instruction and an instruction number; and the to-be-sent instruction acquiring module is further configured to: use an executing component executing the arithmetic instruction as a target executing component, and update, in response to receiving a signal of completely executing the instruction returned by the target executing component, the number of instructions completely executed by the target executing component; determine whether the updated number of instructions completely executed by the target executing component is greater than or equal to the instruction number; and acquire in response to determining that the updated number of instructions completely executed by the target executing component is greater than or equal to the instruction number, the next to-be-sent instruction.

In some embodiments, the instruction queue is established by: receiving task information; extracting at least two arithmetic instructions from the task information; selecting an arithmetic instruction from the at least two arithmetic instructions in order of instruction execution for use as a to-be-added instruction, and executing following adding: determining whether there is data dependence between the to-be-added instruction and an arithmetic instruction previously added to the instruction queue; and adding, in response to determining that there is no data dependence, the to-be-added instruction to the instruction queue; and generating, in response to determining that there is data dependence, a blocking instruction associated with a dependent arithmetic instruction, adding the generated blocking instruction and the to-be-added instruction sequentially to the instruction queue, selecting an arithmetic instruction from the at least two arithmetic instructions for use as the to-be-added instruction, and continuing to execute the adding.

In some embodiments, the instruction queue is established by: receiving task information; extracting at least two arithmetic instructions from the task information; selecting an arithmetic instruction from the at least two arithmetic instructions in order of instruction execution for use as a to-be-added instruction, and executing following adding: determining a number of cacheable instructions of an executing component for executing the to-be-added instruction; determining an instruction number of the to-be-added instruction in a given arithmetic type in order of adding to the instruction queue; determining whether the instruction number minus one is less than or equal to the number of cacheable instructions; and adding, in response to determining that the instruction number minus one is less than or equal to the number of cacheable instructions, the to-be-added instruction to the instruction queue; and generating, in response to determining that the instruction number minus one is greater than the number of cacheable instructions, a blocking instruction associated with an arithmetic instruction having an instruction number identical to the number of cacheable instructions, adding the generated blocking instruction and the to-be-added instruction sequentially to the instruction queue, selecting an arithmetic instruction from the at least two arithmetic instructions for use as the to-be-added instruction, and continuing to execute the adding.

In a third aspect, an embodiment of the present disclosure provides an electronic device, including: one or more processors; and a storage apparatus, storing one or more programs thereon, where the one or more programs, when executed by the one or more processors, cause the one or more processors to implement the method according to any one embodiment in the first aspect.

In a fourth aspect, an embodiment of the present disclosure provides a computer readable storage medium, storing a computer program thereon, where the program, when executed by a processor, implements the method according to any one embodiment in the first aspect.

The method and apparatus for executing an instruction provided in the embodiments of the present disclosure receive an instruction queue, then acquire a to-be-sent instruction from the instruction queue in preset order, determine a type of the to-be-sent instruction, and may determine an executing component executing the to-be-sent instruction from an executing component set when determining the to-be-sent instruction being an arithmetic instruction, thereby sending the to-be-sent instruction to the determined executing component; may stop acquiring a next to-be-sent instruction when determining the to-be-sent instruction being a blocking instruction, and then acquires the next to-be-sent instruction after receiving a signal for instructing an instruction associated with the to-be-sent instruction being completely executed. Therefore, when there is data dependence between instructions of the instruction queue, a current instruction is executed after an instruction on which the current instruction depends is completely executed, to improve the reliability of instruction execution; second, instructions with data dependence are provided in a given instruction queue to reduce the number of instruction queues, thereby reducing the volume of a memory occupied by the instruction queues; third, when the to-be-sent instruction is determined to be a non-blocking instruction, the instruction may be sent to an executing component corresponding to the instruction for execution, thereby improving the utilization of the executing component in the executing component set, and further improving the efficiency of instruction execution.

BRIEF DESCRIPTION OF THE DRAWINGS

By reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
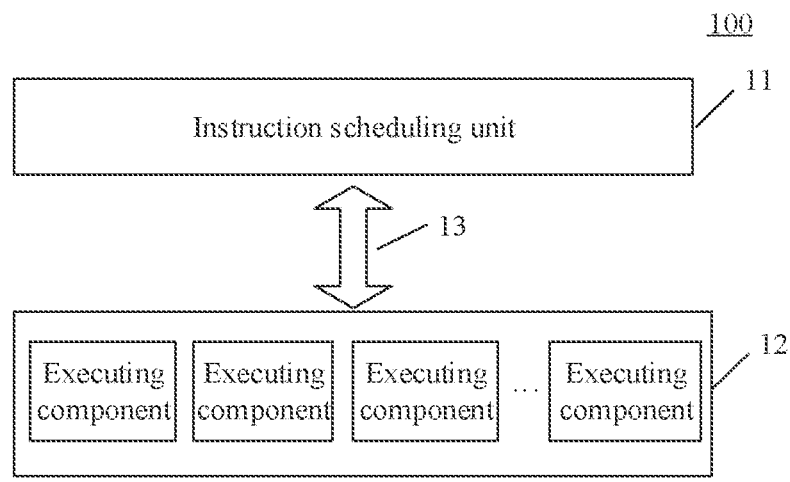
FIG. 1 is an architectural diagram of an exemplary system in which an embodiment of the present disclosure may be applied.

FIG. 1 shows an exemplary system architecture 100 in which an embodiment of a method for executing an instruction or an apparatus for executing an instruction of the present disclosure may be applied.

As shown in FIG. 1, the system architecture 100 may include an instruction scheduling unit 11, an executing component 12, and a bus 13. The bus 13 serves as a medium providing a communication link between the instruction scheduling unit 11 and the executing component 12, e.g., a PCIE (Peripheral Component Interconnect Express) bus. Here, the system architecture 100 may be applied to an artificial intelligence chip or a computer.

The artificial intelligence (AI) chip, also referred to as an AI accelerator or computing card, is specially used for processing a large amount of compute-intensive computational tasks in artificial intelligence applications. When the system architecture 100 is applied to the artificial intelligence chip, the instruction scheduling unit 11 may include an instruction memory for storing instructions, a data memory for storing data, other programmable elements, and the like; and the executing component 12 may include a general purpose executing component, a special purpose executing component, and the like. The general purpose executing component includes a programmable general purpose computing graphics processor, and the like, and the special purpose executing component includes at least one of the following items: a single data processor, a plane data processor, a channel data processor, a special purpose memory, or a data restructuring engine. For example, when the above artificial intelligence chip is a special purpose deep learning processor, the above executing components may include a data processing component for matrix computing, a data processing component for image convolution calculating, and the like.

When the system architecture 100 is applied to the computer, the instruction scheduling unit 11 may include a memory, a central processing unit, and the like, and the executing component 12 may include a programmable element, such as a general purpose programmable computing graphics processor.

The instruction scheduling unit 11 may interact with the executing component 12 via the bus 13 to send and receive messages. The instruction scheduling unit 11 may send an instruction in an instruction queue to the executing component 12, and receive a signal of completely executing the instruction returned by the executing component 12.

It should be noted that the method for executing an instruction provided in the embodiments of the present disclosure is generally executed by the instruction scheduling unit 11. Accordingly, the apparatus for executing an instruction is generally provided in the instruction scheduling unit 11.

It should be understood that the numbers of instruction executing units, buses and executing components in FIG. 1 are merely illustrative. Any suitable number of instruction executing units, buses and executing components may be provided based on actual requirements.

Figure 2:
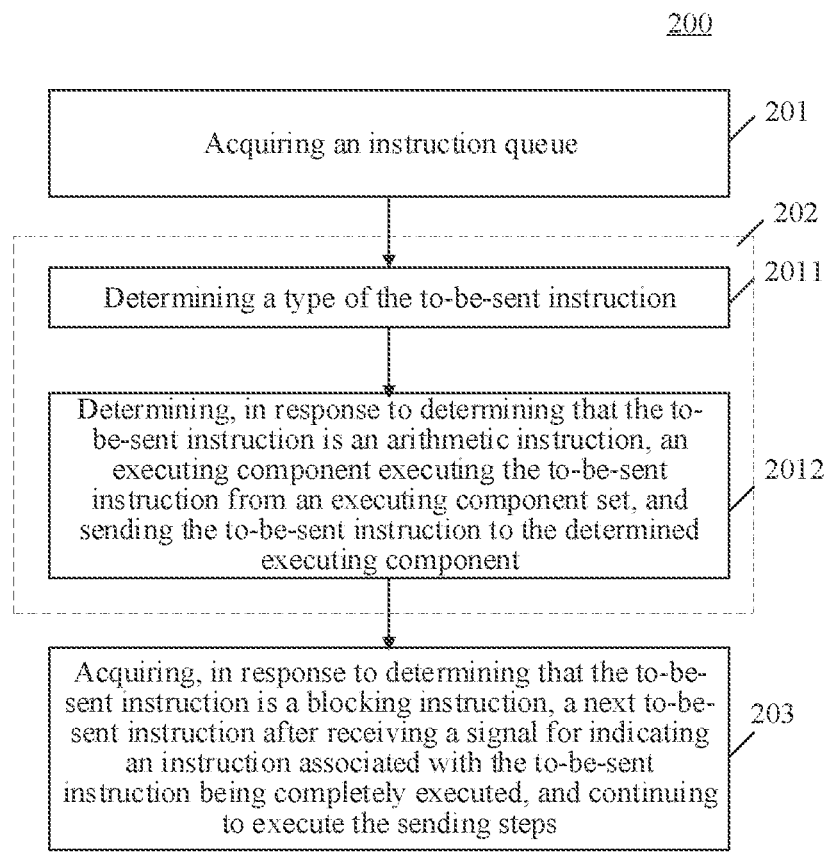
FIG. 2 is a flowchart of an embodiment of a method for executing an instruction according to the present disclosure.

Further referring to FIG. 2, a process 200 of an embodiment of a method for executing an instruction according to the present disclosure is shown. The method for executing an instruction may include the following steps.

Step 201: Acquiring an instruction queue.

In the present embodiment, an executing body (e.g., the instruction scheduling unit 11 shown in FIG. 1) of the method for executing an instruction may acquire the instruction queue. Here, the instruction queue stores various instructions. Specifically, the instructions in the instruction queue may include an operating instruction. Here, the operating instruction may be an instruction that may be executed by a special purpose executing component of an artificial intelligence chip, e.g., a matrix computing instruction, or a vector arithmetic instruction. The instruction queue may be generated by a central processor based on a task in a received request for acquiring a task sent from the outside, or may be pre-stored in the artificial intelligence chip. Thus, the executing body may be communicatively connected to the central processor, and acquire the instruction queue from the central processor, or directly acquire the instruction queue from the artificial intelligence chip. The instruction queue is generally arranged in order of instruction execution. For example, the executing body may be provided with an instruction queue cache. The above instruction queue may be stored in the instruction queue cache. The instruction queue cache generally follows a "first in first out" principle. That is, an instruction that is first stored in the instruction queue cache is executed preferentially.

Step 202: Acquiring a to-be-sent instruction from the instruction queue in preset order, and executing the following sending steps.

Step 2011: Determining a type of the to-be-sent instruction.

In the present embodiment, the executing body acquires the to-be-sent instruction from the instruction queue in preset order (e.g., first in first out order) based on the acquired instruction queue. Here, the executing body may acquire to-be-sent instructions one by one from the instruction queue. After acquiring an instruction, the type of the to-be-sent instruction may be first determined. Here, the type of the to-be-sent instruction may include an arithmetic instruction and a blocking instruction. Specifically, the arithmetic instruction is used for instructing an operation, for example, for instructing a data filtering operation, for instructing a data aggregation operation, for instructing an image convolution operation, or for instructing a full connection operation. Generally, the arithmetic instruction may be subdivided into a plurality of arithmetic instructions of different types (e.g., a convolution operation instruction, and a full connection operation instruction) based on the arithmetic type. Arithmetic instructions of a given type may be executed by a given executing component. Generally, a given task may be completed by mutual cooperation between instructions stored in a given instruction queue. Thus, the given executing component executes the arithmetic instructions of the given type, to improve the speed of instruction execution, and further improve the efficiency of task processing.

Step 2012: Determining an executing component executing the to-be-sent instruction from an executing component set in response to determining that the to-be-sent instruction is an arithmetic instruction, and sending the to-be-sent instruction to the determined executing component.

In the present embodiment, the executing body may determine the executing component executing the to-be-sent instruction from the executing component set in response to determining that the to-be-sent instruction is the arithmetic instruction. Specifically, each instruction in the instruction queue may include an instruction identifier. The instruction identifier may be used for identifying the arithmetic type of the instruction. For example, a packet header of a data packet generated by the instruction may be used as the instruction identifier. The executing body may store a corresponding relationship table between instruction identifiers and executing components for executing instructions matching the instruction identifiers. Thus, after acquiring the to-be-sent instruction, the executing body may find out the executing component for executing the to-be-sent instruction in the executing component set from the above corresponding relationship table, and then send the to-be-sent instruction to the determined executing component, to cause the determined executing component to execute the to-be-sent instruction.

Step 203: Acquiring, in response to determining that the to-be-sent instruction is a blocking instruction, a next to-be-sent instruction after receiving a signal for indicating an instruction associated with the to-be-sent instruction being completely executed, and continuing to execute the sending steps.

In the present embodiment, the executing body may determine, in response to determining that the to-be-sent instruction is the blocking instruction, which specific instruction needs to be completely executed before continuing to acquire the next instruction from the instruction queue. Here, the instruction associated with the to-be-sent instruction is the instruction that needs to be completely executed. Here, the instruction identifier of the instruction that needs to be completely executed may be associated with a blocking instruction. The executing body may match the instruction identifier of a received instruction completely executed with the instruction identifier associated with the to-be-sent instruction, and when the matching is successful, the executing body may determine that the instruction associated with the to-be-sent instruction is completely executed. Thus, the executing body may acquire the next to-be-sent instruction, and then continue to execute the sending steps.

As an optional implementation, the instruction queue may be established by the following steps.

First, the executing body may receive task information. Here, the task information may be a task sent from the outside and received by the artificial intelligence chip or computer. Specifically, when the artificial intelligence chip is a convolutional neural network model, the task may be a task of acquiring image classification result by inputting an image; a task of acquiring semantic result by inputting a word, and the like. The task information may be information for describing the task, for example, may be text information, image information, process information, and the like. As an example, the information for describing the task, for example, may include convolution operation, full connection operation, pooling operation, and the like.

In general, the executing body may be pre-provided with a protocol or standard (e.g., C language, or JAVA language) for converting the task information into a machine language. Therefore, after receiving the task information, the executing body may extract at least two arithmetic instructions from the task information.

Then, the executing body may select an arithmetic instruction from the at least two arithmetic instructions in order of instruction execution for use as a to-be-added instruction, and execute the following adding step: determining whether there is data dependence between the to-be-added instruction and an arithmetic instruction previously added to the instruction queue, that is, whether the operand of the to-be-added instruction needs the arithmetic results of one or a few arithmetic instructions added to the instruction queue. In response to determining that there is no data dependence between the to-be-added instruction and the arithmetic instruction previously added to the instruction queue, the to-be-added instruction may be added to the instruction queue.

In response to determining that there is data dependence between the to-be-added instruction and the arithmetic instruction previously added to the instruction queue, a blocking instruction associated with at least one dependent arithmetic instruction may be generated. That is, the instruction identifier of the at least one dependent arithmetic instruction may be associated with the blocking instruction, so that the blocking instruction may specifically indicate which instruction or which instructions are blocked. Then, the generated blocking instruction and the to-be-added instruction are added sequentially to the instruction queue, the arithmetic instruction is further selected from the at least two arithmetic instructions for use as the to-be-added instruction, and execution of the adding step is continued.

As another implementation, the instruction queue may also be established by the following steps.

First, the executing body may receive task information.

Then, at least two arithmetic instructions are extracted from the task information.

Then, the arithmetic instruction is selected from the at least two arithmetic instructions in order of instruction execution for use as a to-be-added instruction, and the following adding step is executed: determining a number of cacheable instructions of an executing component for executing the to-be-added instruction. Specifically, a given executing component in the executing component set may be used for executing instructions of a given arithmetic type. Completing a task generally includes a plurality of instructions of a given arithmetic type, and therefore, the instruction queue generally includes a plurality of instructions of a given arithmetic type. In order to improve the execution efficiency of the executing component, generally, a cache may be provided in the executing component, so that when the executing component executes a last instruction, a to-be-executed instruction may be cached in the executing component. The efficiency of sending an instruction in the instruction queue may also be enhanced, and the utilization of executing components executing different arithmetic types may be further improved. However, the number of cacheable instructions in the executing component is generally limited. In order to prevent loss of the instructions, the executing body may first determine the number of cacheable instructions of the executing component for executing the to-be-added instruction. Then, in order of adding to the instruction queue, the instruction number of the to-be-added instruction in the given arithmetic type is determined. Then, whether the instruction number minus one is less than or equal to the number of cacheable instructions is determined. Here, the instruction number minus one is intended to remove the instruction being executed by the executing component. Finally, the executing body may add the to-be-added instruction to the instruction queue in response to determining that the instruction number minus one is less than or equal to the number of cacheable instructions.

Finally, in response to determining that the instruction number minus one is greater than the number of cacheable instructions, a blocking instruction associated with an arithmetic instruction having an instruction number identical to the number of cacheable instructions is generated, the generated blocking instruction and the to-be-added instruction are added sequentially to the instruction queue, an arithmetic instruction is selected from the at least two arithmetic instructions for use as the to-be-added instruction, and execution of the adding step is continued.

Figure 3:
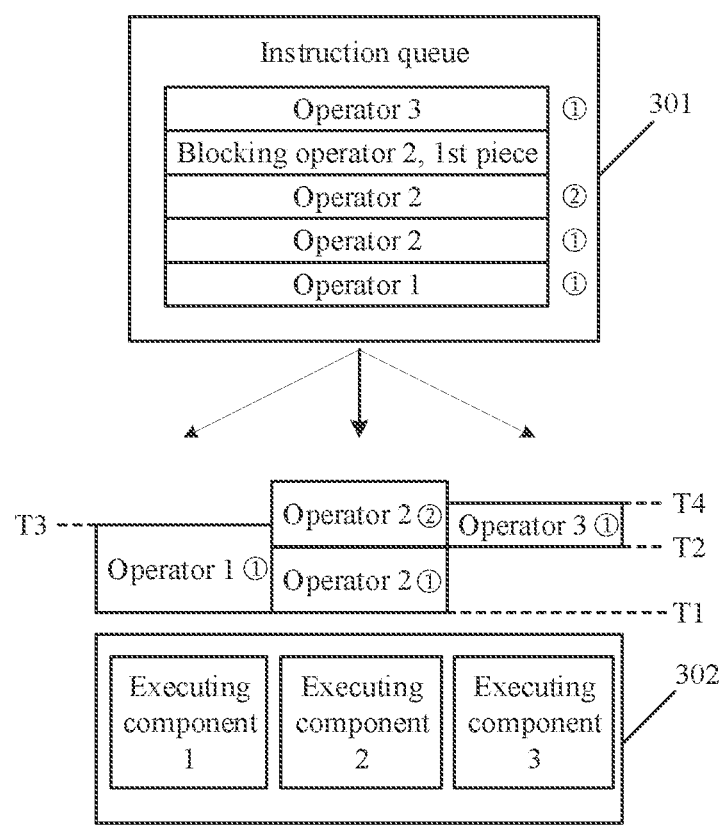
FIG. 3 is a schematic diagram of an application scenario of the method for executing an instruction according to the present disclosure.

Further referring to FIG. 3, an application scenario of the method for executing an instruction according to the present disclosure is shown.

In the application scenario shown in FIG. 3, the instruction queue 301 follows the "first in first out" principle. That is, an instruction that is first added to the instruction queue 301 will be first executed. FIG. 3 shows an operator instruction and a block instruction. The operator instruction is an arithmetic instruction, and the block instruction is a blocking instruction. The operator instruction further includes arithmetic instructions of three arithmetic types, namely an operator 1, an operator 2, and an operator 3. The instruction queue 301 includes one operator 1 with an instruction number ①; two operators 2 with instruction numbers being ① and ② respectively; and one operator 3 with an instruction number ①. The instruction number represents an order of adding an arithmetic instruction of each type to the instruction queue 301. The operator 2 with the instruction number ① is first added to the instruction queue 301, i.e., will be first executed, and then the operator 2 with the instruction number ② is added to the instruction queue 301. In FIG. 3, the block instruction is used for blocking the operator 2 with the number ①. That is, an operand of the operator 3 with the instruction number ① requests execution result of the operator 2 with the instruction number ①. Therefore, the block instruction is used for indicating to execute the operator 3 after completely executing the instruction of the operator 2 with the instruction number ①. No instruction will be released before the instruction of the operator 2 with the instruction number ① is completely executed. The executing component 302 shown in FIG. 3 is used for executing instructions in the instruction queue. The arithmetic instructions of a given arithmetic type may be executed by a given executing component. The executing component 1 is used for executing the operator 1, the executing component 2 is used for executing the operator 2, and the executing component 3 is used for executing the operator 3.

Specifically, at a moment T1, the operator 1 is sent to the executing component 1, and the operator 2 with the instruction number ① will not be blocked, but will be immediately sent to the executing component 2, so that the operator 1 and the operator 2 will be executed simultaneously. If an instruction cache exists within each executing component, then the instruction queue may continue to send the operator 2 with the instruction number ② to the executing component 2, which may avoid blocking subsequent instructions from being sent, and further improve the scheduling efficiency. After completely sending the operator 2 with the instruction number ②, the instruction queue will perform parsing to obtain a block instruction. This block instruction is an instruction blocking the operator 2 with the instruction number ①, and therefore the instruction queue will begin to wait for the operator 2 with the instruction number ① to be completely executed. At a moment T2, the operator 2 with the instruction number ① is completely executed, and the executing component 2 will immediately begin to execute the operator 2 with the instruction number ② in the cache, while the instruction queue will continue to send the operator 3 to the executing component 3 after finding the operator 2 with the instruction number ① completely executed. Since the moment T2, three executing components run simultaneously until a moment T3 when the operator 1 is completely executed, and then the executing component 2 and the executing component 3 continue to run simultaneously for a period of time until a moment T4 when the operator 3 is completely executed.

The method for executing an instruction provided in the embodiment of the present disclosure receives an instruction queue, then acquires a to-be-sent instruction from the instruction queue in preset order, determines a type of the to-be-sent instruction, and may determine an executing component executing the to-be-sent instruction from an executing component set when determining the to-be-sent instruction being an arithmetic instruction, thereby sending the to-be-sent instruction to the determined executing component; may stop acquiring a next to-be-sent instruction when determining the to-be-sent instruction being a blocking instruction, and then acquires the next to-be-sent instruction after receiving a signal for instructing an instruction associated with the to-be-sent instruction being completely executed. Therefore, when there is data dependence between instructions of the instruction queue, a current instruction is executed after an instruction on which the current instruction depends is completely executed, to improve the reliability of instruction execution; second, instructions with data dependence are provided in a given instruction queue to reduce the number of instruction queues, thereby reducing the volume of a memory occupied by the instruction queues; third, when the to-be-sent instruction is determined to be a non-blocking instruction, the instruction may be sent to an executing component corresponding to the instruction for execution, thereby improving the utilization of the executing component in the executing component set, and further improving the efficiency of instruction execution.

Figure 4:
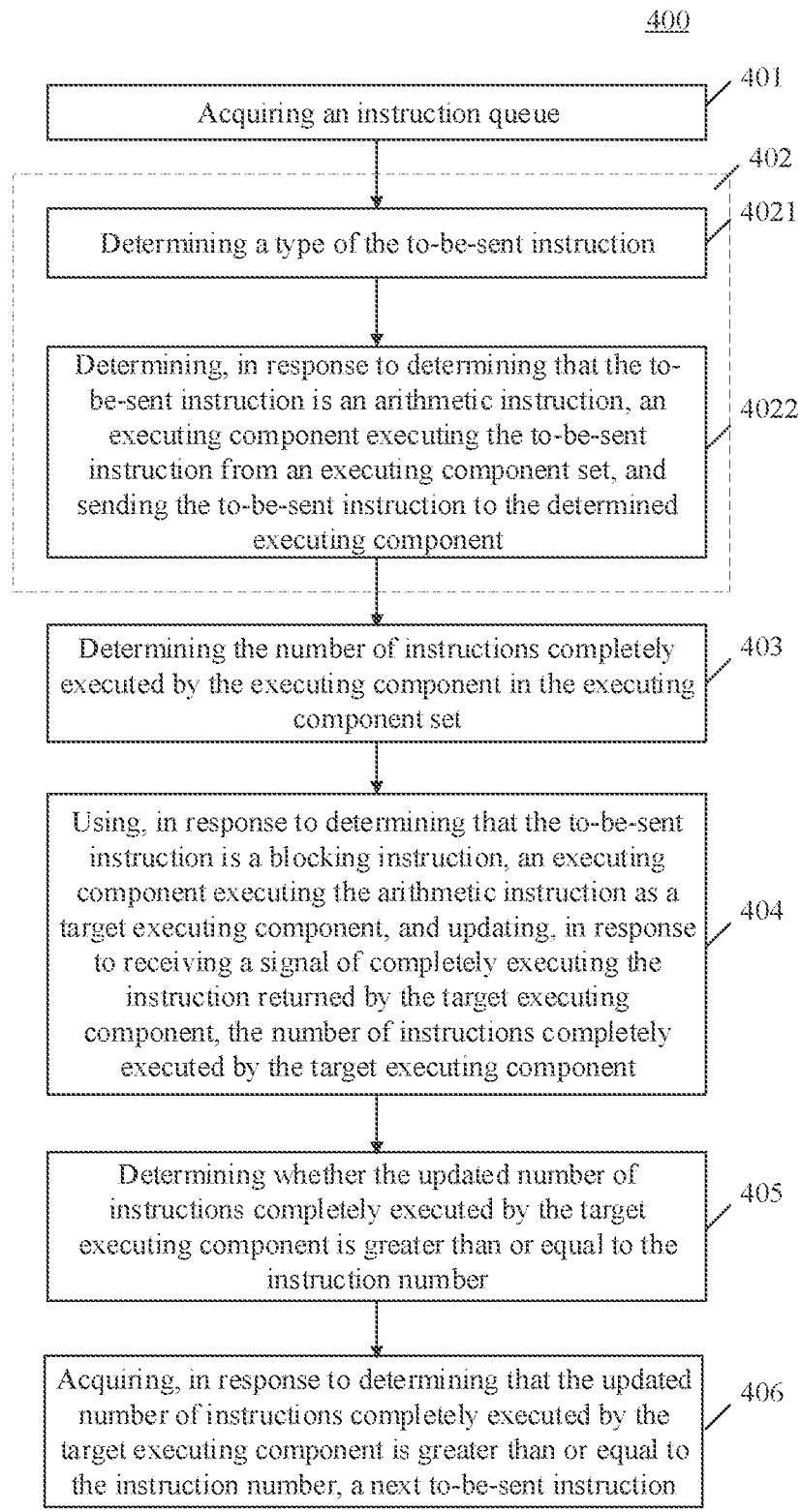
FIG. 4 is a flowchart of another embodiment of the method for executing an instruction according to the present disclosure.

Further referring to FIG. 4, a process 400 of another embodiment of the method for executing an instruction according to the present disclosure is shown. The method for executing an instruction may include the following steps.

Step 401: Acquiring an instruction queue.

In the present embodiment, an executing body (e.g., the instruction scheduling unit 11 shown in FIG. 1) of the method for executing an instruction may acquire the instruction queue. Here, the instruction queue stores various instructions. Specifically, the instructions in the instruction queue may include an operating instruction. Here, the operating instruction may be an instruction that may be executed by a special purpose executing component of an artificial intelligence chip, e.g., a matrix calculating instruction, or a vector arithmetic instruction. The instruction queue may be generated by a central processor based on a task in a received request for acquiring a task sent from the outside, or may be pre-stored in the artificial intelligence chip. Thus, the executing body may be communicatively connected to the central processor, and acquire the instruction queue from the central processor, or directly acquire the instruction queue from the artificial intelligence chip. The instruction queue is generally arranged in order of instruction execution.

Step 402: Acquiring a to-be-sent instruction from the instruction queue in preset order, and executing following sending steps.

Step 4021: Determining a type of the to-be-sent instruction.

In the present embodiment, the executing body acquires the to-be-sent instruction from the instruction queue in preset order (e.g., first in first out order) based on the acquired instruction queue. Here, the executing body may acquire to-be-sent instructions one by one from the instruction queue. After acquiring one instruction, the type of the to-be-sent instruction may be first determined. Here, the type of the to-be-sent instruction may include an arithmetic instruction and a blocking instruction.

Step 4022: Determining, in response to determining that the to-be-sent instruction is an arithmetic instruction, an executing component executing the to-be-sent instruction from an executing component set, and sending the to-be-sent instruction to the determined executing component.

In the present embodiment, the executing body may determine the executing component executing the to-be-sent instruction from the executing component set in response to determining that the to-be-sent instruction is the arithmetic instruction. Specifically, each instruction in the instruction queue may include an instruction identifier. The instruction identifier may be used for identifying the arithmetic type of the instruction. The executing body may store a corresponding relationship table between instruction identifiers and executing components for executing instructions matching the instruction identifiers. Thus, after acquiring the to-be-sent instruction, the executing body may find out the executing component for executing the to-be-sent instruction in the instruction component set from the above corresponding relationship table, and then send the to-be-sent instruction to the determined executing component, to cause the determined executing component to execute the to-be-sent instruction.

Step 403: Determining the number of instructions completely executed by the executing component in the executing component set.

In the present embodiment, the executing body may be provided with a counter for counting the number of instructions completely executed by the executing component in the executing component set. Here, when completely executing each instruction, the executing component may send a signal of completely executing the instruction to the executing body. Therefore, the executing body may determine the number of completely executed instructions corresponding to executing components based on the number of received signals of completely executing instructions sent by executing bodies within a preset period of time. Thus, the instruction execution status may be determined better.

Step 404: Using, in response to determining that the to-be-sent instruction is a blocking instruction, an executing component executing the arithmetic instruction as a target executing component, and updating, in response to receiving a signal of completely executing the instruction returned by the target executing component, the number of instructions completely executed by the target executing component.

In the present embodiment, an instruction associated with the to-be-sent instruction may include an arithmetic type of the instruction and an instruction number. Therefore, when determining the to-be-sent instruction being a blocking instruction, the executing component executing the arithmetic type of the instruction associated with the to-be-sent instruction may be used as the target executing component. The number of instructions completely executed by the target executing component may be updated in response to receiving a signal of completely executing the instruction returned by the target executing component. Here, the instruction number may be a sequence number of the arithmetic type of the instruction associated with the to-be-sent instruction in the instruction queue, that is, the rank order of the associated instruction in the instruction queue of arithmetic instructions of a given type.

Step 405: Determining whether the updated number of instructions completely executed by the target executing component is greater than or equal to the instruction number.

In the present embodiment, the executing body may further determine whether the updated number of instructions completely executed by the target executing component is greater than or equal to the instruction number of the instruction associated with the to-be-sent instruction.

Step 406: Acquiring, in response to determining that the updated number of instructions completely executed by the target executing component being greater than or equal to the instruction number, a next to-be-sent instruction.

In the present embodiment, the executing body may determine the instruction associated with the to-be-sent instruction being completely executed in response to determining the updated number of instructions completely executed by the target executing component being greater than or equal to the instruction number of the instruction associated with the to-be-sent instruction. Thus, the executing body may acquire the next to-be-sent instruction, and then continue to execute Step 402 to Step 406.

As can be seen from FIG. 4, compared with the embodiment corresponding to FIG. 2, the process 400 of the method for executing an instruction in the present embodiment highlights providing a counter in the executing body, and determining a completion status of the instruction associated with the to-be-sent instruction by counting the number of instructions completely executed by executing components, thereby improving the accuracy of sending the instructions.

Figure 5:
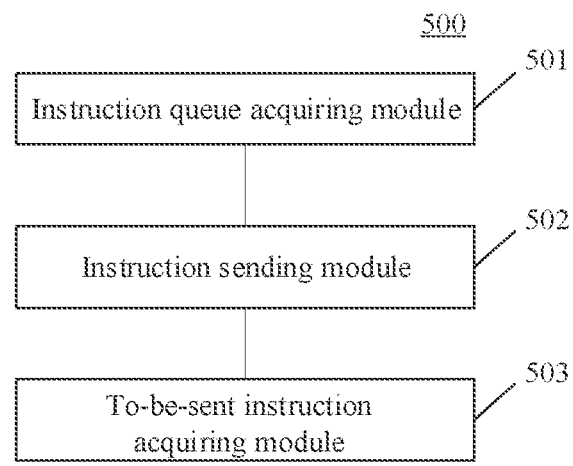
FIG. 5 is a schematic structural diagram of an embodiment of an apparatus for executing an instruction according to the present disclosure.

Further referring to FIG. 5, as an implementation of the method shown in FIG. 2 and FIG. 4, the present disclosure provides an embodiment of an apparatus for executing an instruction. The embodiment of the apparatus corresponds to the embodiment of the method shown in FIG. 2, and the apparatus may be specifically applied to an instruction scheduling unit of an artificial intelligence chip or a computer.

As shown in FIG. 5, the apparatus 500 for executing an instruction of the present embodiment may include an instruction queue acquiring module 501, an instruction sending module 502, and a to-be-sent instruction acquiring module 503. The instruction queue acquiring module 501 is configured to acquire an instruction queue. The instruction sending module 502 is configured to acquire a to-be-sent instruction from the instruction queue in preset order, and execute following sending steps: determining a type of the to-be-sent instruction; determining, in response to determining that the to-be-sent instruction is an arithmetic instruction, an executing component executing the to-be-sent instruction from an executing component set, and sending the to-be-sent instruction to the determined executing component. The to-be-sent instruction acquiring module 503 is configured to acquire, in response to determining that the to-be-sent instruction is a blocking instruction, a next to-be-sent instruction after receiving a signal for indicating an instruction associated with the to-be-sent instruction being completely executed, and continue to execute the sending steps.

The related description of implementations of step 201, step 202, and step 203 in the corresponding embodiment of FIG. 2 may be referred to for the specific processing of the instruction queue acquiring module 501, the instruction sending module 502, and the to-be-sent instruction acquiring module 503 of the apparatus 500 for executing an instruction in the present embodiment, and beneficial effects thereof. The description will not be repeated here.

In some optional implementations of the present embodiment, the apparatus 500 for executing an instruction further includes: a counting module (not shown), configured to count the number of instructions completely executed by the executing component in the executing component set.

In some optional implementations of the present embodiment, the instruction associated with the to-be-sent instruction includes an arithmetic type of the instruction and an instruction number; and the to-be-sent instruction acquiring module 503 is further configured to: use an executing component executing the arithmetic instruction as a target executing component, and update, in response to receiving a signal of completely executing the instruction returned by the target executing component, the number of instructions completely executed by the target executing component; determine whether the updated number of instructions completely executed by the target executing component is greater than or equal to the instruction number; and acquire, in response to determining that the updated number of instructions completely executed by the target executing component is greater than or equal to the instruction number, the next to-be-sent instruction.

In some embodiments, the instruction queue is established by: receiving task information; extracting at least two arithmetic instructions from the task information; selecting an arithmetic instruction from the at least two arithmetic instructions in order of instruction execution for use as a to-be-added instruction, and executing following adding steps: determining whether there is data dependence between the to-be-added instruction and an arithmetic instruction previously added to the instruction queue; and adding, in response to determining that there is no data dependence, the to-be-added instruction to the instruction queue; and generating, in response to determining that there is data dependence, a blocking instruction associated with a dependent arithmetic instruction, adding the generated blocking instruction and the to-be-added instruction sequentially to the instruction queue, selecting an arithmetic instruction from the at least two arithmetic instructions for use as the to-be-added instruction, and continuing to execute the adding steps.

In some embodiments, the instruction queue is established by: receiving task information; extracting at least two arithmetic instructions from the task information; selecting an arithmetic instruction from the at least two arithmetic instructions in order of instruction execution for use as a to-be-added instruction, and executing following adding steps: determining a number of cacheable instructions of an executing component for executing the to-be-added instruction; determining an instruction number of the to-be-added instruction in a given arithmetic type in order of adding to the instruction queue; determining whether the instruction number minus one is less than or equal to the number of cacheable instructions; and adding, in response to determining that the instruction number minus one is less than or equal to the number of cacheable instructions, the to-be-added instruction to the instruction queue; and generating, in response to determining that the instruction number minus one is greater than the number of cacheable instructions, a blocking instruction associated with an arithmetic instruction having an instruction number identical to the number of cacheable instructions, adding the generated blocking instruction and the to-be-added instruction sequentially to the instruction queue, selecting an arithmetic instruction from the at least two arithmetic instructions for use as the to-be-added instruction, and continuing to execute the adding.

The apparatus for executing an instruction provided in the embodiments of the present disclosure first receives an instruction queue, then acquires a to-be-sent instruction from the instruction queue in preset order, determines a type of the to-be-sent instruction, and may determine an executing component executing the to-be-sent instruction from an executing component set when determining the to-be-sent instruction being an arithmetic instruction, thereby sending the to-be-sent instruction to the determined executing component; may stop acquiring a next to-be-sent instruction when determining the to-be-sent instruction being a blocking instruction, and then acquires the next to-be-sent instruction after receiving a signal for instructing an instruction associated with the to-be-sent instruction being completely executed. Therefore, when there is data dependence between instructions of the instruction queue, a current instruction is executed after an instruction on which the current instruction depends is completely executed, to improve the reliability of instruction execution; second, instructions with data dependence are provided in a given instruction queue to reduce the number of instruction queues, thereby reducing the volume of a memory occupied by the instruction queues; third, when the to-be-sent instruction is determined to be a non-blocking instruction, the instruction may be sent to an executing component corresponding to the instruction for execution, thereby improving the utilization of the executing component in the executing component set, and further improving the efficiency of instruction execution.

Figure 6:
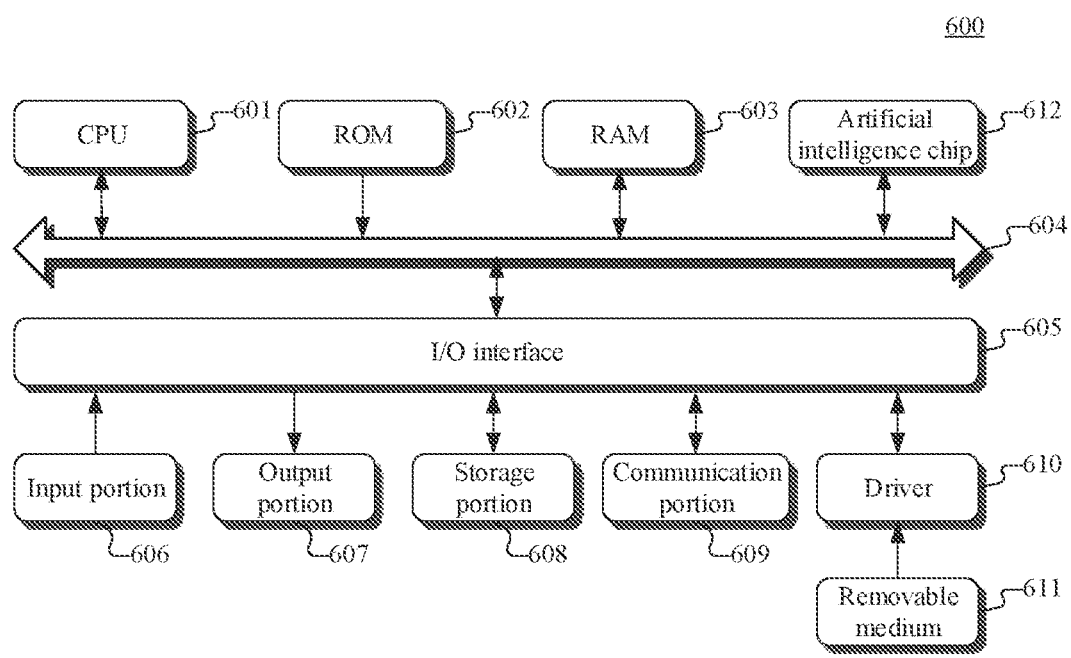
FIG. 6 is a schematic structural diagram of a computer system of an embodiment of an electronic device according to the present disclosure.

An embodiment of the present disclosure further provides an electronic device. FIG. 6 may be referred to for a structure of the electronic device, and shows a schematic structural diagram of a computer system 600 of an embodiment of the electronic device in the present disclosure. The electronic device shown in FIG. 6 is merely an example, and should not limit the function and scope of use of the embodiments of the present disclosure.

As shown in FIG. 6, the computer system 600 includes one or more central processing units (CPU) 601 and one or more artificial intelligence chips 612. The CPU 601 may execute various appropriate actions and processes in accordance with a program stored in a read-only memory (ROM) 602 or a program loaded into a random access memory (RAM) 603 from a storage portion 608. The artificial intelligence chip 612 includes one or more instruction scheduling units, and one or more executing units. The artificial intelligence chip 612 may execute various appropriate actions and processes in accordance with a program received from the CPU 601. The RAM 603 also stores various programs and data required by operations of the system 600. The CPU 601, the ROM 602, the RAM 603, and the artificial intelligence chip 612 are connected to each other through a bus 604. An input/output (I/O) interface 605 is also connected to the bus 604.

The following components are connected to the I/O interface 605: an input portion 606 including a touch screen, a key, a mouse, a microphone, a camera, or the like; an output portion 607 including an organic light emitting diode (OLED) display, a liquid crystal display (LCD), a speaker, or the like; a storage portion 608 including a hard disk or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, so that a computer program read therefrom is installed on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the general purpose executing component of the artificial intelligence chip 612, implements the above functions as defined by the method of the present disclosure.

It should be noted that the computer readable medium according to the present disclosure may be a computer readable signal medium or a computer readable storage medium or any combination of the above two. An example of the computer readable storage medium may include, but is not limited to: an electric, magnetic, optical, electromagnetic, infrared, or semiconductor system, apparatus, element, or a combination of any of the above. A more specific example of the computer readable storage medium may include, but is not limited to: electrical connection with one or more wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as a part of a carrier wave, in which computer readable program codes are carried. The propagating data signal may take various forms, including but not limited to: an electromagnetic signal, an optical signal or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, two blocks presented in succession may be executed, substantially in parallel, or they may sometimes be executed in a reverse sequence, depending on the function involved. It should also be noted that each block in the block diagrams and/or flow charts as well as a combination of blocks in the block diagrams and/or flow charts may be implemented using a dedicated hardware-based system executing specified functions or operations, or by a combination of a dedicated hardware and computer instructions.

The modules involved in the embodiments of the present disclosure may be implemented by means of software or hardware. The described modules may also be provided in a processor, for example, described as: a general purpose executing component including an instruction queue acquiring module, an instruction sending module, and a to-be-sent instruction acquiring module. The names of these modules do not constitute a limitation to such modules themselves in some cases. For example, the instruction queue acquiring module may also be described as "a module for acquiring an instruction queue."

In another aspect, the present disclosure further provides a computer readable medium. The computer readable medium may be included in the electronic device described in the above embodiments, or a stand-alone computer readable medium without being assembled into the electronic device. The computer readable medium stores one or more programs. The one or more programs, when executed by the electronic device, cause the electronic device to: acquire an instruction queue; acquire a to-be-sent instruction from the instruction queue in preset order, and execute following sending steps: determining a type of the to-be-sent instruction; determining, in response to determining that the to-be-sent instruction is an arithmetic instruction, an executing component executing the to-be-sent instruction from an executing component set, and sending the to-be-sent instruction to the determined executing component; and acquire, in response to determining that the to-be-sent instruction is a blocking instruction, a next to-be-sent instruction after receiving a signal for instructing an instruction associated with the to-be-sent instruction being completely executed, and continue to execute the sending.

The above description only provides explanation of the preferred embodiments of the present disclosure and the employed technical principles. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A method for executing instructions in an instruction queue, the instruction queue being generated from a computing task by a processor, the method comprising:
generating instructions to form the instruction queue;
acquiring an instruction from the instruction queue in preset order, and executing a sending step comprising: determining a type of the acquired instruction; in response to determining that the type of the acquired instruction is an arithmetic instruction, determining an executing component for executing the arithmetic instruction from an executing component set, and sending the arithmetic instruction to the determined executing component; and
in response to determining that the type of the acquired instruction is a blocking instruction, acquiring a next instruction from the instruction queue after receiving a signal indicating that an instruction associated with the blocking instruction is completely executed, and executing, for the next instruction, the sending step, wherein the blocking instruction is generated based on there being data dependence between the next instruction and the instruction associated with the blocking instruction, wherein the instruction associated with the blocking instruction is an arithmetic instruction previously added to the instruction queue.

2. The method according to claim 1, further comprising:
determining a number of instructions completely executed by the executing component in the executing component set.

3. The method according to claim 2, wherein the instruction associated with the blocking instruction comprises an arithmetic type of the instruction associated with the blocking instruction and an instruction serial number, and arithmetic instructions of a same arithmetic type are executed by a same executing component; and, in response to determining that the type of the acquired instruction is a blocking instruction, acquiring a next instruction from the instruction queue after receiving a signal indicating that an instruction associated with the blocking instruction is completely executed comprises:
using an executing component executing the instruction associated with the blocking instruction as a target executing component, and updating, in response to receiving a signal of completely executing the instruction associated with the blocking instruction returned by the target executing component, a number of instructions completely executed by the target executing component;
determining whether the updated number of instructions completely executed by the target executing component is greater than or equal to the instruction serial number; and
in response to determining that the updated number of instructions completely executed by the target executing component is greater than or equal to the instruction serial number, acquiring the next instruction.

4. The method according to claim 1, wherein generating instructions to form the instruction queue comprises:
receiving task information of the computing task;
extracting at least two arithmetic instructions from the task information;
selecting an arithmetic instruction from the at least two arithmetic instructions in order of instruction execution for use as a to-be-added instruction, and executing an adding step comprising: determining whether there is data dependence between the to-be-added instruction and the arithmetic instruction previously added to the instruction queue; and in response to determining that there is no data dependence between the to-be-added instruction and the arithmetic instruction previously added to the instruction queue, adding the to-be-added instruction to the instruction queue; and
in response to determining that there is data dependence between the to-be-added instruction and the arithmetic instruction previously added to the instruction queue, generating the blocking instruction associated with the arithmetic instruction previously added to the instruction queue on which the to-be-added instruction depends and determining the arithmetic instruction previously added to the instruction queue as the instruction associated with the blocking instruction, adding the blocking instruction and the to-be-added instruction sequentially to the instruction queue, selecting, from the at least two arithmetic instructions, another arithmetic instruction for use as the to-be-added instruction, and executing, for the another arithmetic instruction, the adding step.

5. The method according to claim 1, wherein generating instructions to form the instruction queue comprises:
receiving task information of the computing task;
extracting at least two arithmetic instructions from the task information;
selecting an arithmetic instruction from the at least two arithmetic instructions in order of instruction execution for use as a to-be-added instruction, and executing an adding step comprising: determining a number of cacheable instructions of an executing component for executing the to-be-added instruction; determining an instruction serial number of the to-be-added instruction according to an arithmetic type of the to-be-added instruction and an order of the to-be-added instruction being added to the instruction queue; determining whether the instruction serial number of the to-be-added instruction minus one is less than or equal to the number of cacheable instructions; and in response to determining that the instruction serial number of the to-be-added instruction minus one is less than or equal to the number of cacheable instructions, adding the to-be-added instruction to the instruction queue; and in response to determining that the instruction serial number of the to-be-added instruction minus one is greater than the number of cacheable instructions, generating the blocking instruction associated with an arithmetic instruction having an instruction serial number identical to the number of cacheable instructions, adding the blocking instruction and the to-be-added instruction sequentially to the instruction queue, selecting another arithmetic instruction from the at least two arithmetic instructions for use as the to-be-added instruction, and executing, for the another arithmetic instruction, the adding step.

6. The method according to claim 1, wherein generating instructions to form the instruction queue comprises:

receiving task information of the computing task;

extracting at least two arithmetic instructions from the task information;

selecting an arithmetic instruction from the at least two arithmetic instructions in order of instruction execution for use as a to-be-added instruction;

in response to determining that there is data dependence between the to-be-added instruction and the arithmetic instruction previously added to the instruction queue, generating the blocking instruction associated with the arithmetic instruction previously added to the instruction queue on which the to-be-added instruction depends, determining the arithmetic instruction previously added to the instruction queue as the instruction associated with the blocking instruction, and adding the blocking instruction and the to-be-added instruction sequentially to the instruction queue.

7. An apparatus for executing instructions in an instruction queue, the instruction queue being generated from a computing task by a processor, the apparatus comprising:

at least one processor; and a memory storing instructions, wherein the instructions when executed by the at least one processor, cause the at least one processor to perform operations, the operations comprising:

generating instructions to form the instruction queue;

acquiring an instruction from the instruction queue in preset order, and executing a sending step comprising: determining a type of the acquired instruction; in response to determining that the type of the acquired instruction is an arithmetic instruction, determining an executing component for executing the arithmetic instruction from an executing component set, and sending the arithmetic instruction to the determined executing component; and in response to determining that the type of the acquired instruction is a blocking instruction, acquiring a next instruction from the instruction queue after receiving a signal indicating that an instruction associated with the blocking instruction is completely executed, and executing, for the next instruction, the sending step, wherein the blocking instruction is generated based on there being data dependence between the next instruction and the instruction associated with the blocking instruction, wherein the instruction associated with the blocking instruction is an arithmetic instruction previously added to the instruction queue.

8. The apparatus according to claim 7, wherein the operations further comprise:

counting a number of instructions completely executed by the executing component in the executing component set.

9. The apparatus according to claim 8, wherein the instruction associated with the blocking instruction comprises an arithmetic type of the instruction associated with the blocking instruction and an instruction serial number, and arithmetic instructions of a same arithmetic type are executed by a same executing component; and, in response to determining that the type of the acquired instruction is a blocking instruction, acquiring a next instruction from the instruction queue after receiving a signal indicating that an instruction associated with the blocking instruction is completely executed comprises:

using an executing component executing the instruction associated with the blocking instruction as a target executing component, and updating, in response to receiving a signal of completely executing the instruction associated with the blocking instruction returned by the target executing component, a number of instructions completely executed by the target executing component;

determining whether the updated number of instructions completely executed by the target executing component is greater than or equal to the instruction serial number; and in response to determining that the updated number of instructions completely executed by the target executing component is greater than or equal to the instruction serial number, acquiring the next instruction.

10. The apparatus according to claim 7, wherein generating instructions to form the instruction queue comprises:

receiving task information of the computing task;

extracting at least two arithmetic instructions from the task information;

selecting an arithmetic instruction from the at least two arithmetic instructions in order of instruction execution for use as a to-be-added instruction, and executing an adding step comprising: determining whether there is data dependence between the to-be-added instruction and the arithmetic instruction previously added to the instruction queue; and in response to determining that there is no data dependence between the to-be-added instruction and the arithmetic instruction previously added to the instruction queue, adding the to-be-added instruction to the instruction queue; and in response to determining that there is data dependence between the to-be-added instruction and the arithmetic instruction previously added to the instruction queue, generating the blocking instruction associated with the arithmetic instruction previously added to the instruction queue on which the to-be-added instruction depends and determining the arithmetic instruction previously added to the instruction queue as the instruction associated with the blocking instruction, adding the blocking instruction and the to-be-added instruction sequentially to the instruction queue, selecting, from the at least two arithmetic instructions, another arithmetic instruction for use as the to-be-added instruction, and executing, for the another arithmetic instruction, the adding step.

11. The apparatus according to claim 7, wherein generating instructions to form the instruction queue comprises:

receiving task information of the computing task;

extracting at least two arithmetic instructions from the task information;

selecting an arithmetic instruction from the at least two arithmetic instructions in order of instruction execution for use as a to-be-added instruction, and executing an adding step comprising: determining a number of cacheable instructions of an executing component for executing the to-be-added instruction; determining an instruction serial number of the to-be-added instruction according to an arithmetic type of the to-be-added instruction and an order of the to-be-added instruction being added to the instruction queue; determining whether the instruction serial number of the to-be-added instruction minus one is less than or equal to the number of cacheable instructions; and in response to determining that the instruction serial number of the to-be-added instruction minus one is less than or equal to the number of cacheable instructions, adding the to-be-added instruction to the instruction queue; and in response to determining that the instruction serial number of the to-be-added instruction minus one is greater than the number of cacheable instructions, generating the blocking instruction associated with an arithmetic instruction having an instruction serial number identical to the number of cacheable instructions, adding the blocking instruction and the to-be-added instruction sequentially to the instruction queue, selecting another arithmetic instruction from the at least two arithmetic instructions for use as the to-be-added instruction, and executing, for the another arithmetic instruction, the adding step.

12. A non-transitory computer readable medium, storing a computer program thereon, wherein the computer program, when executed by an executing component, implements operations for executing instructions in an instruction queue, the instruction queue being generated from a computing task by a processor, the operations comprising:

generating instructions to form the instruction queue;

acquiring an instruction from the instruction queue in preset order, and executing a sending step comprising: determining a type of the acquired instruction; in response to determining that the type of the acquired instruction is an arithmetic instruction, determining an executing component for executing the arithmetic instruction from an executing component set, and sending the arithmetic instruction to the determined executing component; and in response to determining that the type of the acquired instruction is a blocking instruction, acquiring a next instruction from the instruction queue after receiving a signal indicating that an instruction associated with the blocking instruction is completely executed, and executing, for the next instruction, the sending step, wherein the blocking instruction is generated based on there being data dependence between the next instruction and the instruction associated with blocking instruction, wherein the instruction associated with the blocking instruction is an arithmetic instruction previously added to the instruction queue.

13. The non-transitory computer readable medium according to claim 12, wherein the operations further comprise:

determining a number of instructions completely executed by the executing component in the executing component set.

14. The non-transitory computer readable medium according to claim 13, wherein the instruction associated with the blocking instruction comprises an arithmetic type of the instruction associated with the blocking instruction and an instruction serial number, and arithmetic instructions of a same arithmetic type are executed by a same executing component; and in response to determining that the type of the acquired instruction is a blocking instruction, acquiring a next instruction from the instruction queue after receiving a signal indicating that an instruction associated with the blocking instruction is completely executed comprises:

using an executing component executing the instruction associated with the blocking instruction as a target executing component, and updating, in response to receiving a signal of completely executing the instruction associated with the blocking instruction returned by the target executing component, a number of instructions completely executed by the target executing component;

determining whether the updated number of instructions completely executed by the target executing component is greater than or equal to the instruction serial number; and in response to determining that the updated number of instructions completely executed by the target executing component is greater than or equal to the instruction serial number, acquiring the next instruction.

15. The non-transitory computer readable medium according to claim 12, wherein generating instructions to form the instruction queue comprises:

receiving task information of the computing task;

extracting at least two arithmetic instructions from the task information;

selecting an arithmetic instruction from the at least two arithmetic instructions in order of instruction execution for use as a to-be-added instruction, and executing an adding step comprising: determining whether there is data dependence between the to-be-added instruction and the arithmetic instruction previously added to the instruction queue; and in response to determining that there is no data dependence between the to-be-added instruction and the arithmetic instruction previously added to the instruction queue, adding the to-be-added instruction to the instruction queue; and in response to determining that there is data dependence between the to-be-added instruction and the arithmetic instruction previously added to the instruction queue, generating the blocking instruction associated with the arithmetic instruction previously added to the instruction queue on which the to-be-added instruction depends and determining the arithmetic instruction previously added to the instructing queue as the instruction associated with the blocking instruction, adding the blocking instruction and the to-be-added instruction sequentially to the instruction queue, selecting, from the at least two arithmetic instructions, another arithmetic instruction for use as the to-be-added instruction, and executing, for the another arithmetic instruction, the adding step.

16. The non-transitory computer readable medium according to claim 12, wherein generating instructions to form the instruction queue comprises:

receiving task information of the computing task;

extracting at least two arithmetic instructions from the task information;

selecting an arithmetic instruction from the at least two arithmetic instructions in order of instruction execution for use as a to-be-added instruction, and executing an adding step comprising: determining a number of cacheable instructions of an executing component for executing the to-be-added instruction; determining an instruction serial number of the to-be-added instruction according to an arithmetic type of the to-be-added instruction and an order of the to-be-added instruction being added to the instruction queue; determining whether the instruction serial number of the to-be-added instruction minus one is less than or equal to the number of cacheable instructions; and in response to determining that the instruction serial number minus one is less than or equal to the number of cacheable instructions, adding the to-be-added instruction to the instruction queue; and in response to determining that the instruction serial number of the to-be-added instruction minus one is greater than the number of cacheable instructions, generating the blocking instruction associated with an arithmetic instruction having an instruction serial number identical to the number of cacheable instructions, adding the blocking instruction and the to-be-added instruction sequentially to the instruction queue, selecting another arithmetic instruction from the at least two arithmetic instructions for use as the to-be-added instruction, and executing, for the another arithmetic instruction, the adding step.

* * * * *

UNITED STATES PATENT AND TRADEMARK OFFICE
CERTIFICATE OF CORRECTION

PATENT NO. : 11,422,817 B2
APPLICATION NO. : 16/458381
DATED : August 23, 2022
INVENTOR(S) : Jing Wang et al.

It is certified that error appears in the above-identified patent and that said Letters Patent is hereby corrected as shown below:

In the Claims

Column 21, Line 56, Claim 12, delete "with" and insert -- with the --

Column 22, Line 50, Claim 15, delete "instructing" and insert -- instruction --

Signed and Sealed this
Twenty-fifth Day of October, 2022

*Katherine Kelly Vidal*

Katherine Kelly Vidal
*Director of the United States Patent and Trademark Office*